(12) United States Patent
Leinberger et al.

(10) Patent No.: US 8,037,259 B2
(45) Date of Patent: Oct. 11, 2011

(54) SYSTEM AND METHOD FOR MANAGING ADDRESSES IN A COMPUTING SYSTEM

(75) Inventors: William J. Leinberger, Woodbury, MN (US); Bobby Jim Kowalski, Vadnais Heights, MN (US); Ronald R. Denny, Brooklyn Center, MN (US)

(73) Assignee: General Dynamics Advanced Information Systems, Inc., Fairfax, VA (US)

( * ) Notice: Subject to any disclaimer, the term of this patent is extended or adjusted under 35 U.S.C. 154(b) by 678 days.

(21) Appl. No.: 12/155,294

(22) Filed: Jun. 2, 2008

(65) Prior Publication Data

US 2008/0301390 A1  Dec. 4, 2008

Related U.S. Application Data

(60) Provisional application No. 60/924,845, filed on Jun. 1, 2007.

(51) Int. Cl.
  *G06F 12/00* (2006.01)
(52) U.S. Cl. ...................................................... 711/154
(58) Field of Classification Search ......................... None
  See application file for complete search history.

(56) References Cited

U.S. PATENT DOCUMENTS

| | | | |
|---|---|---|---|
| 5,249,280 A | 9/1993 | Nash et al. | |
| 5,522,058 A | 5/1996 | Iwasa et al. | |
| 5,574,939 A | 11/1996 | Keckler et al. | |
| 5,860,146 A | 1/1999 | Vishin et al. | |
| 5,887,138 A | 3/1999 | Hagersten et al. | |
| 5,897,664 A | 4/1999 | Nesheim et al. | |
| 6,112,268 A | 8/2000 | Ohashi et al. | |
| 6,449,700 B2 | 9/2002 | Hagersten et al. | |
| 6,678,798 B1 | 1/2004 | Kuskin et al. | |
| 6,823,438 B2 | 11/2004 | Hooper et al. | |
| 6,915,387 B1 | 7/2005 | Huffman et al. | |
| 6,922,766 B2 | 7/2005 | Scott | |
| 6,925,547 B2 | 8/2005 | Scott et al. | |
| 6,938,128 B1 | 8/2005 | Kuskin et al. | |
| 7,356,026 B2 | 4/2008 | Scott et al. | |
| 2003/0028530 A1 | 2/2003 | Nagaraja | |
| 2005/0025140 A1* | 2/2005 | Deforche et al. | ............. 370/363 |
| 2006/0224815 A1 | 10/2006 | Yamada et al. | |

OTHER PUBLICATIONS

Dynamic Hasing Schemes, R. J. Enbody et al, AMC Computing Surveys Jun. 1988.*
International Searching Authority, "International Search Report and Written Opinion." Nov. 13, 2008.

* cited by examiner

*Primary Examiner* — Duc Doan
(74) *Attorney, Agent, or Firm* — Ingrassia Fisher and Lorenz, P.C.

(57) ABSTRACT

A method for retrieving and managing addresses is provided. The steps may include of receiving, at a first buffer of m buffers, a request for an address; obtaining the address from a corresponding first register of the m registers; sending the address, received by said obtaining, to a destination; storing the address, received by the obtaining, in the first buffer; and clearing the contents of a second buffer of the m buffers, in response to any of said receiving, obtaining or storing, without clearing the contents of said first buffer, wherein m is a positive integer.

32 Claims, 4 Drawing Sheets

SYSTEM AND METHOD FOR MANAGING ADDRESSES IN A COMPUTING SYSTEM

CROSS REFERENCE TO RELATED APPLICATIONS

The present invention related to U.S. Provisional Patent Application 60/924,845, the contents of which are herein incorporated by reference in its entirety.

BACKGROUND OF THE INVENTION

1. Field of the Invention

The present invention relates to management of addresses in a computing system. More particularly, the present invention relates to leveraging a processor's natural methodology of virtual to physical address translation to reduce latency in accessing dispersed data.

2. Discussion of Background Information

Figure 1A:
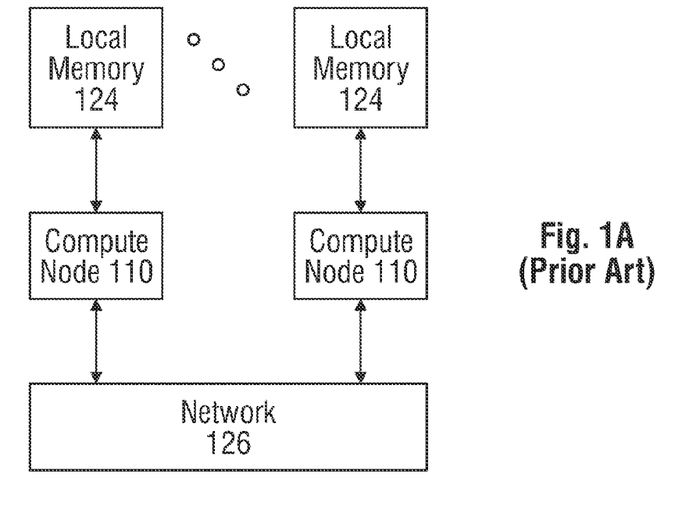
FIGS. 1A and 1B illustrate prior art arrangements of compute nodes.
Figure 1B:
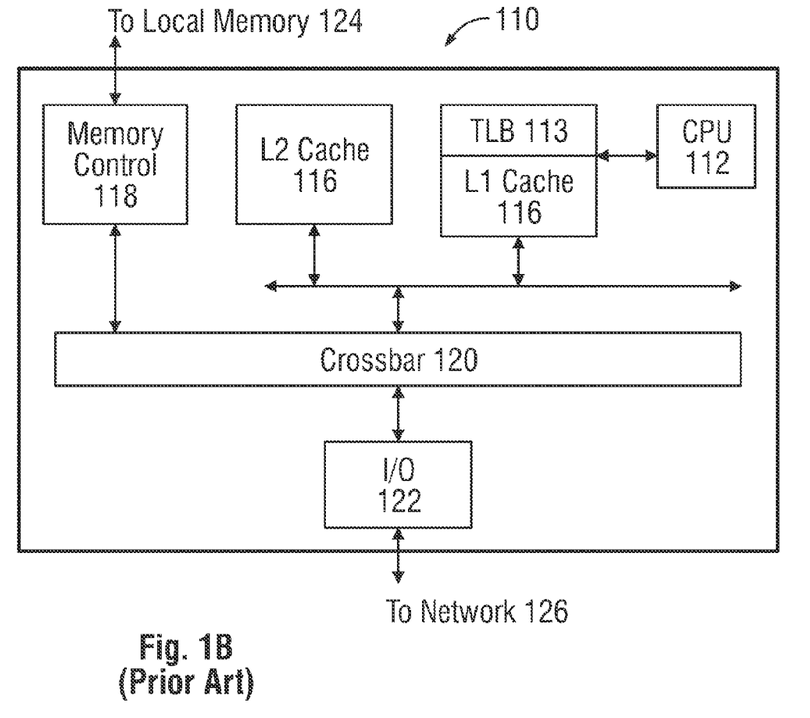

A Partitioned Global Address Spaced (PGAS) computer architecture with parallel multiprocessors is well known. A typical architecture is shown in FIGS. 1A and 1B. Each compute node 110 includes a CPU 112, a translation lookaside buffer 113, a level 1 cache 114, a level 2 cache 116, a memory control 118, a crossbar 120, and an input/output ("I/O") device 122. Each compute node 110 accesses a corresponding local memory 124. The various compute nodes 110 connect via a network 126 as is known in the art. Each of the various local memories 124 collectively form a global memory for the system.

Such prior art systems utilize a virtual address to physical address translation mechanism to locate data required to fulfill requested processes from CPU 112. The virtual address only represents the address of corresponding responsive data, but is not the actual physical address of the data (the actual location of the data in memory). A page table stored in local memory 124 maps the individual virtual addresses to individual physical addresses, each such entry in the table being a page table entry or "PGE." When CPU 112 generates a virtual address, the system accesses the page table at the appropriate PGE to identify the corresponding physical address for the requested data. Translation lookaside buffer ("TLB") 113 stores the PGE's for the most recent transactions.

A compute node 110 can access its own local memory 124 by generating a request (a read or write command) for which the resulting physical address falls within the address range assigned to that local memory 124. The same mechanism accesses the global memory in remote local memories 124 by generating a virtual address that falls within the global address space. For a virtual address which corresponds to a physical address in a remote local memory 124, the virtual address is sent through network 126 for read/wire operations as appropriate.

When compute node 110 generates a virtual address, it initially always checks the TLB 113 to determine whether it already has a page entry for that particular virtual address. TLB 113 is typically a content-addressable memory, in which the search key is the virtual address and the search result is a physical address. If the search yields a match, the physical address is provided quickly without having to access the page table in local memory 124. If the virtual address is not in the TLB 113, then it is considered a "miss"; CPU 112 has to access the page table in local memory 124 directly, which takes longer to complete and consumes local memory bandwidth.

The Partitioned Global Address Spaced architecture carries several advantages, including fine grained (single word) communication and a large memory space. However, the large memory creates corresponding latency in data location. One such latency is due to the fact that data are dispersed throughout the global memory system. Given such dispersal, it is less likely that any particular virtual address will be in TLB 113. Yet the processors are nonetheless programmed to check the TLB 113 for each virtual address, effectively creating a large number of "misses" (i.e., no prior translation is found in the TLB 113) that add latency and consume more local memory bandwidth. TLB 113 is considered to be "thrashing," such that its benefits are largely offset.

Once the addresses are translated, the large memory space of the system often generates new latencies due to the time that it takes to obtain the data from remote memories. To reduce the impact of this latency, prior art processors use a hierarchy of data caches to move remote data nearer to the CPU core. Rather than only accessing the data requested by the read or write operation, the system requests and retrieves some multiple of the basic operation size (a cache line) as the data cache. As long as there is good "data locality"—in that data tends to be stored sequentially such that the next request read/write operation would draw upon the next data entry in the cache—then this cache line retrieval method can hide or amortize the above-noted access latency penalties.

However, there are situations in which the underlying data are highly dispersed. For example, some applications store data randomly rather than sequentially, such that it is unlikely that the next data entry in the cache line would correspond to the desired data. The resulting number of misses at the cache level adds a new layer of latency.

SUMMARY OF THE INVENTION

According to an embodiment of the invention, a method for retrieving and managing addresses of data amongst a bank of m buffers and a corresponding bank of m registers is provided. The method includes receiving, at a first buffer of the m buffers, a request for an address; obtaining the address from a corresponding first register of the m registers; sending the address, received by the obtaining, to a destination; storing the address, received by the obtaining, in the first buffer; and clearing the contents of a second buffer of the m buffers, in response to any of the receiving, obtaining or storing, without clearing the contents of the first buffer; wherein m is a positive integer.

The above embodiment may have various features. The clearing may comprises clearing the contents of the second buffer of the m buffers, in response to any of the receiving, obtaining or storing, without clearing the contents of any remaining buffers of the m buffers. The second buffer may be k buffers downstream from the first buffer, and k is a positive integer. K may be less than m. M may be an even number, and m=2k. The registers may be FIFO registers. The method may also include, before the receiving, populating the registers with physical addresses.

According to another embodiment of the invention, a method for retrieving and managing physical addresses amongst a local node, a local memory, and a memory manager is provided. The method includes an initiation phase, and first and second retrieval phases. The initialization phase includes defining a program to be executed; and establishing, in the local memory, a table of virtual addresses and corresponding fictitious physical addresses, the fictitious physical addresses corresponding to locations within the memory manager, each virtual address and corresponding fictitious physical address having a corresponding actual physical address of responsive data for execution of the program. The first retrieval phase includes generating a virtual address at the local node; retrieving from a table in the local memory table the fictitious physical address that corresponds to the generated virtual address; entering the fictitious physical address and the corresponding virtual address into the buffer in the local node; and utilizing, in conjunction with the memory manager, the retrieved fictitious address to obtain the actual physical address that corresponds to the virtual address. The second retrieval phase, following the first retrieval phase, includes generating, at the local node, a virtual address; obtaining, from the buffer in the local node, a fictitious physical address corresponding to the virtual address; and utilizing the retrieved fictitious address to obtain the actual physical address that corresponds to the virtual address. The first retrieval phase completes when the table of virtual address and corresponding fictitious physical addresses in the local memory is entered into the buffer in the local node. During the second retrieval phase, the local node will no longer need to access the table in local memory to complete the program regardless of the number of remaining instructions in the program.

The above embodiment may have various features. The memory manager may include m buffers and m corresponding registers, the local node may have a c level cache, and the table may includes (c+1)(m/2) virtual addresses and corresponding fictitious physical addresses. The utilizing in the first and second retrieval phases may include receiving, at the memory manager, the fictitious physical address; identifying a first buffer of the m buffers that corresponds to the received fictitious physical address; obtaining, using a corresponding first register of the m registers, the corresponding actual physical address; sending the actual physical address, received by the obtaining, to the local node; storing the actual physical address, received by the obtaining, in the first buffer; and clearing the contents of a second buffer of the m buffers without clearing the contents of the first buffer. The clearing may comprise clearing the contents of the second buffer of the m buffers without clearing the contents of any remaining buffers of the m buffers. The second buffer may be k buffers downstream from the first buffer, and k is a positive integer. K may be less than m. M may be an even number, and m=2k. The registers may be FIFO registers. The method may further include, during the initialization phase, populating the registers with the actual physical addresses.

According to another embodiment of the invention, a system for retrieving and managing addresses is provided. A bank of m buffers and a corresponding bank of m registers are configured to: receive, at a first buffer of the m buffers, a request for an address, where m is a positive integer; obtain the address from a corresponding first register of the m registers; send the address, received by the obtaining, to a destination; store the address, received by the obtaining, in the first buffer; and clear the contents of a second buffer of the m buffers without clearing the contents of the first buffer.

The above embodiment may have various optional features. The system may be configured to clear the contents of the second buffer of the m buffers, in response to any of the receiving, obtaining or storing, without clearing the contents of any remaining buffers of the m buffers. The second buffer may be k buffers downstream from the first buffer, and k is a positive integer. K may be less than m. M may be an even number, and m=2k. The registers may be FIFO registers. The system may be configured to an initial step of populating the registers with physical addresses.

According to another embodiment of the invention, a system for retrieving and managing physical addresses is provided. A local node, a local memory, and a memory manager are configured to operate in an initialization phase, and first and second retrieval phases. In the initialization phase, the configuration is designed to define a program to be executed; and establish, in the local memory, a table of virtual addresses and corresponding fictitious physical addresses, the fictitious physical addresses corresponding to locations within the memory manager, each virtual address and corresponding fictitious physical address having a corresponding actual physical address of responsive data for execution of the program. In the first retrieval phase, the configuration is designed to generate a virtual address at the local node; retrieve from a table in the local memory table the fictitious physical address that corresponds to the generated virtual address; enter the fictitious physical address and the corresponding virtual address into the buffer in the local node; and utilize, in conjunction with the memory manager, the retrieved fictitious address to obtain the actual physical address that corresponds to the virtual address. In a second retrieval phase, following the first retrieval phase, the configuration is destined to generate, at the local node, a virtual address; obtain, from the buffer in the local node, a fictitious physical address corresponding to the virtual address; utilize the retrieved fictitious address to obtain the actual physical address that corresponds to the virtual address. The first retrieval phase completes when the table of virtual address and corresponding fictitious physical addresses in the local memory is entered into the buffer in the local node. During the second retrieval phase, the local node will no longer need to access the table in local memory to complete the program regardless of the number of remaining instructions in the program.

The above embodiment may have various features. The memory manager may include m buffers and m corresponding registers, the local node may have a c level cache, and the table may includes (c+1)(m/2) virtual addresses and corresponding fictitious physical addresses. The utilization in the first and second retrieval phases may include receiving, at the memory manager, the fictitious physical address; identifying a first buffer of the m buffers that corresponds to the received fictitious physical address; obtaining, using a corresponding first register of the m registers, the corresponding actual physical address; sending the actual physical address, received by the obtaining, to the local node; storing the actual physical address, received by the obtaining, in the first buffer; and clearing the contents of a second buffer of the m buffers without clearing the contents of the first buffer. The clearing may comprise clearing the contents of the second buffer of the m buffers without clearing the contents of any remaining buffers of the m buffers. The second buffer may be k buffers downstream from the first buffer, and k is a positive integer. K may be less than m. M may be an even number, and m=2k. The registers may be FIFO registers. The system may be configured to an initial step of populating the registers with physical addresses.

BRIEF DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein.

DETAILED DESCRIPTION OF EXEMPLARY EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 3A:
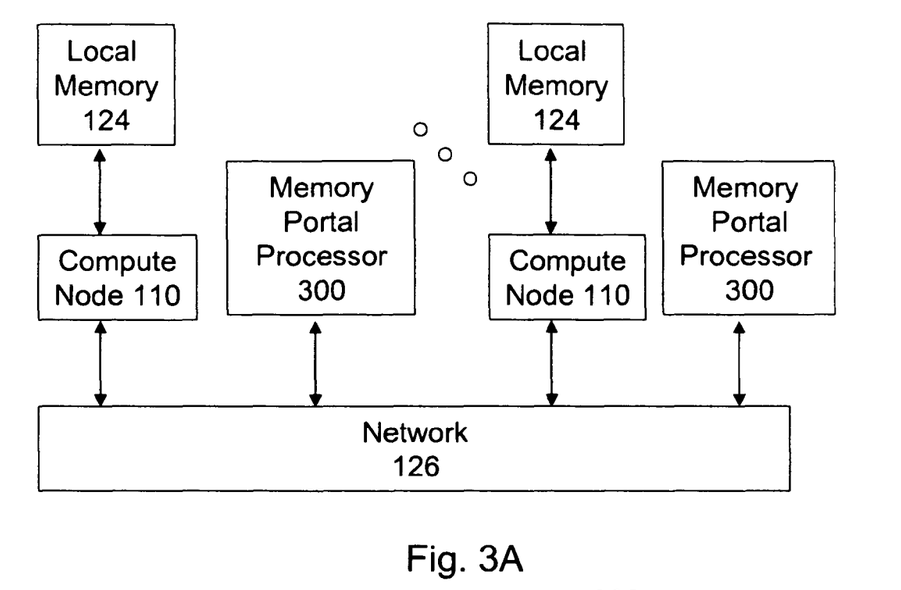
FIGS. 3A and 3B illustrate block diagrams of an embodiment of the invention.
Figure 3B:
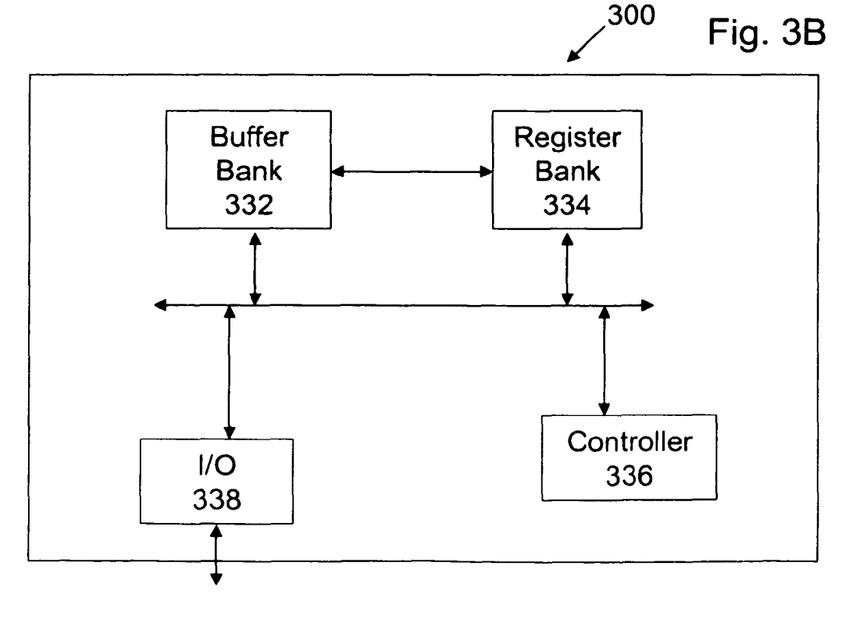

Referring now to FIGS. 3A and 3B, an embodiment of the invention is shown generally at 300. A plurality of compute nodes 110 (corresponding to those shown in FIGS. 1A and 1B) connect through a network 126 to a memory portal processor 300. Compute nodes 110 are preferably commercially available processors. Memory portal processor 300 includes a buffer bank 332, a register bank 334 of FIFO registers, a controller 336, and an I/O device 338. The various interconnections within memory portal processor 300 shown in FIGS. 3A and 3B are exemplary only, and any such connections may be configured as appropriate.

Figure 2:
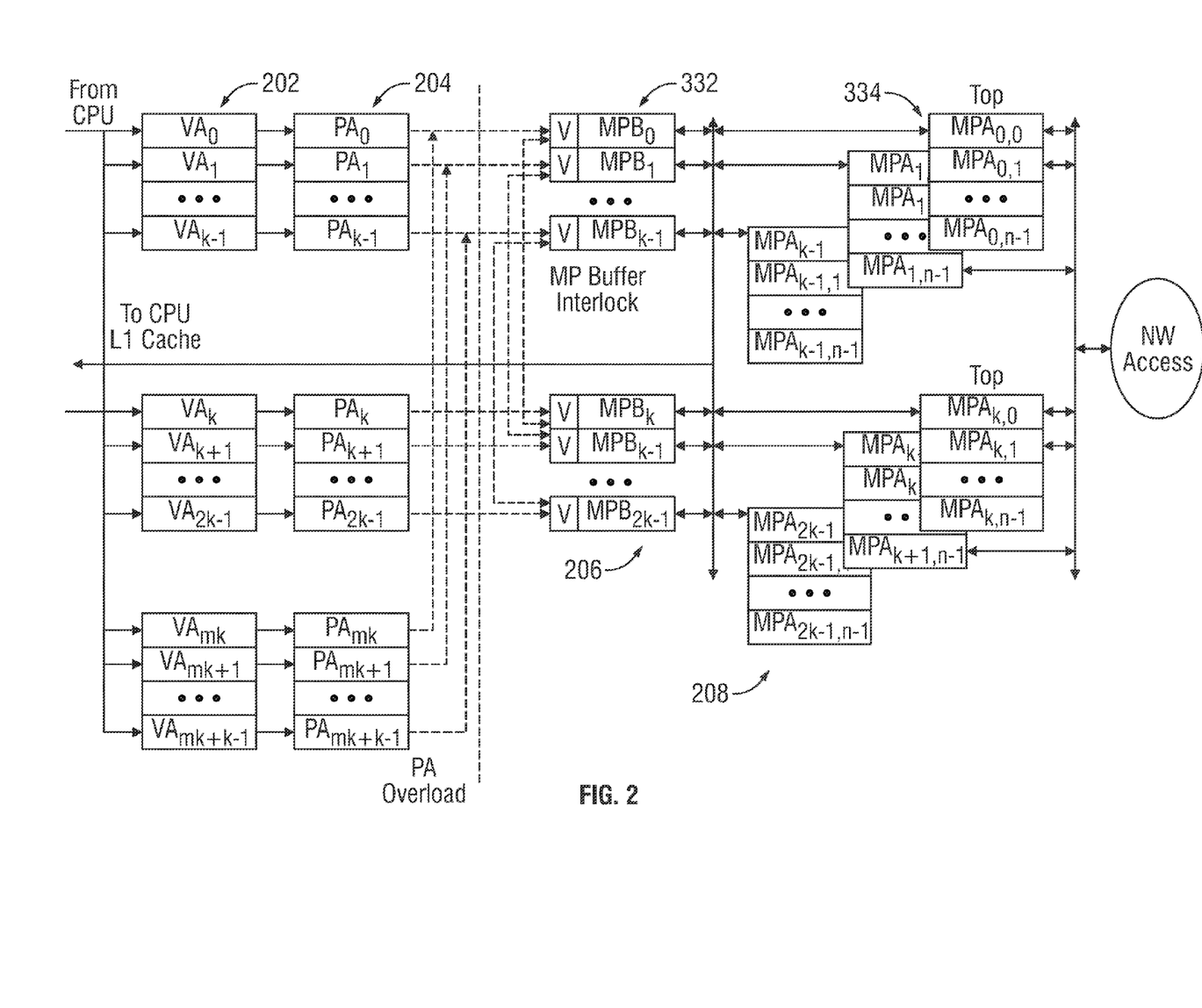
FIG. 2 illustrates a block diagram of an addressing scheme of an embodiment of the present invention.

FIG. 2 shows a block diagram of the relationship between the various addressing relationships the memory portal 300 includes a plurality of virtual addresses 202 (shown as $VA_0$-$VA_{mk+k-1}$), a plurality of corresponding physical addresses 204 (shown as $PA_0$-$PA_{mk+k-1}$), a plurality of address buffers 206 (shown as $MPB_0$-$MPB_{2k-1}$), and a plurality of FIFO registers 208 (shown as $MPA_{0,x}$-$MPA_{2k-1,x}$, where x is 0–(n–1)).

FIG. 2 shows an abstract black box representation of the addresses in local memory 124 and buffer bank 332 and register bank 334 within memory portal 300. Compute node 110 has an associated plurality of virtual addresses 202 (shown as $VA_0$-$VA_{mk+k-1}$) and a plurality of corresponding physical addresses 204 (shown as $PA_0$-$PA_{mk+k-1}$). Buffer bank 332 includes a plurality of address buffers 206 (shown as $MPB_0$-$MPB_{2k-1}$). Register bank 334 includes a plurality of FIFO registers 208 (shown as $MPA_0$-$MPA_{2k-1}$). Each FIFO register has n slots (labeled 0 through n–1). N is preferably equal for each FIFO register 208, but the invention is not so limited. The number of buffers 206 and FIFO registers 208 are preferably equal, and preferably an even number.

The number of addresses, buffers and registers are based on related control elements, particularly the number of address buffers 206 (2k, where k is a positive integer), and k(c+1) virtual and physical addresses, where c is the number of cache levels in the compute node 110. Thus, by way of example, if there are two (2) cache levels and four (4) buffers, then there will be six (6) virtual and physical addresses 202 and 204.

Operation of the above embodiments leverages two existing features of common processors: "prefetch" capability and the translation. For the "prefetch" capability, the program will know in advance the physical addresses of the data that will be needed for steps well into the future. Currently hardware limits the prefetch capability to some 8-16 addresses in advance of processing those addresses, although the invention is not limited to any particular number. Translation involves using the virtual addresses to convert a physical address from which the system will read or write data.

Figure 4:
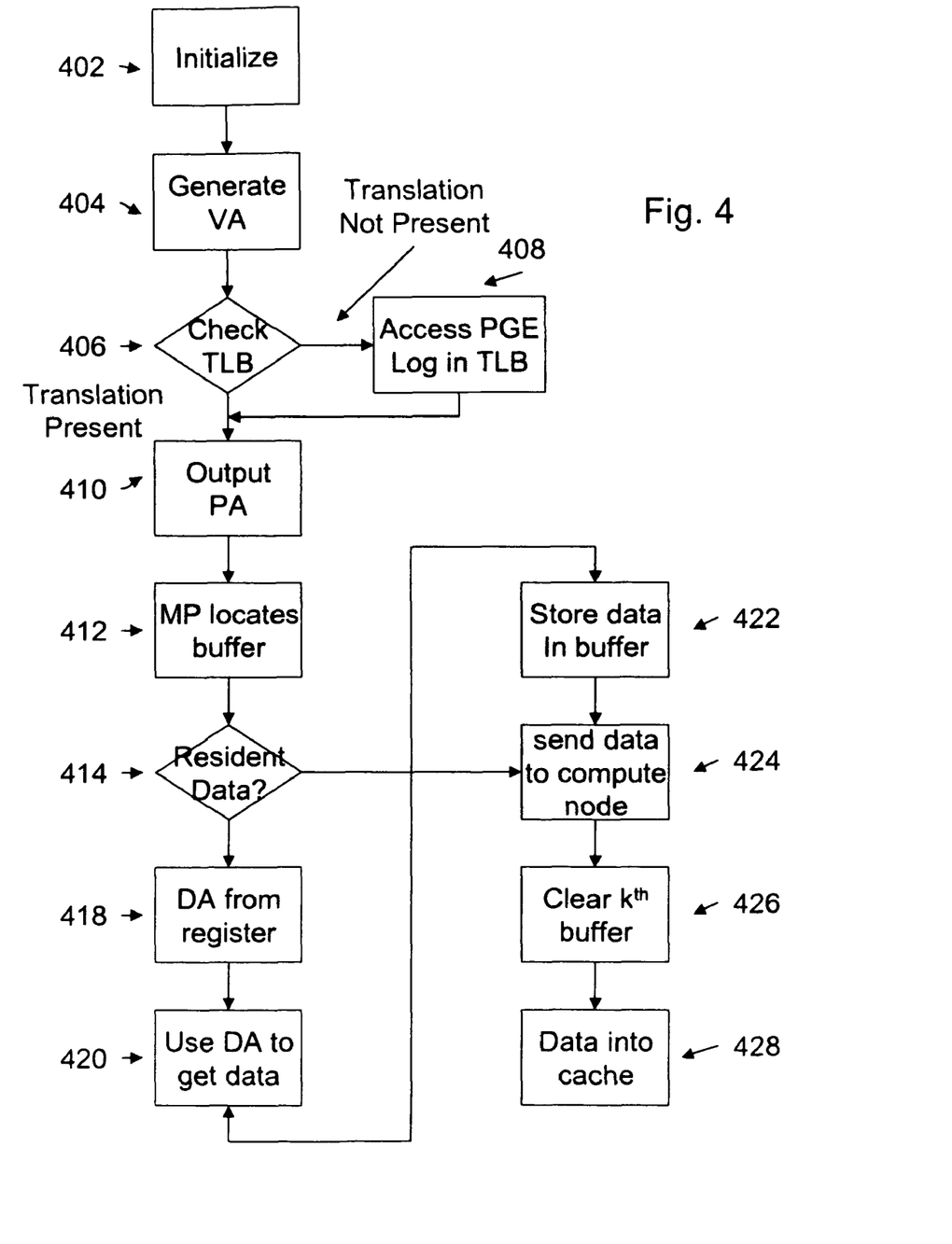
FIG. 4 is a flowchart of steps performed by an embodiment of the invention.

Referring now to FIG. 4, the steps implemented by the embodiment are shown. For ease of discussion, the below details are limited to read requests, although it should be understood that the requests can also be write requests.

On initialization at step S402 the system will load the physical addresses into FIFO registers 208. Each address is sequentially loaded into each register until all registers receive a single address in the first available slot in the FIFO. The system then cycles back to the first register and begins to sequentially write addresses into the next available entry. For example, the first address would be written into the first slot of the first FIFO buffer MPA1,1 (1,1 representing first FIFO, first slot), and the second address would be written into the first slot of the second FIFO buffer MPA2,1. This continues until the last FIFO buffer MPA2k,1. The next address would then be written into the second slot of the first FIFO (MPA1, 2). This process continues until all of the physical addresses are written into Register bank 332 or Register bank reaches its capacity.

Also at step S402, the system sets up the PGE table in the local memory 124 to convert virtual addresses into physical addresses. The physical addresses are for locations within memory portal processor 300 as opposed to any specific data storage points in the system. The PGE is rather short, as only k(c+1) addresses will be needed. By way of non-limiting example, if k=4, and there is a two level cache (c=2), then there are only twelve (4*(2+1)=12) virtual addresses and corresponding physical addresses.

The physical addresses are grouped into (c+1) sets of k, where corresponding addresses in the groups map to the same location in the cache. Thus, for k=4 (2k=8) and a two level cache (c=2), then each set of four addresses would map to the same four locations in the cache:

TABLE I

| Virtual Address | Physical Address | Map Location in Cache |
|---|---|---|
| $VA_1$ | $PA_1$ | $MA_1$ |
| $VA_2$ | $PA_2$ | $MA_2$ |
| $VA_3$ | $PA_3$ | $MA_3$ |
| $VA_4$ | $PA_4$ | $MA_4$ |
| $VA_5$ | $PA_5$ | $MA_1$ |
| $VA_6$ | $PA_6$ | $MA_2$ |
| $VA_7$ | $PA_7$ | $MA_3$ |
| $VA_8$ | $PA_8$ | $MA_4$ |
| $VA_9$ | $PA_9$ | $MA_1$ |
| $VA_{10}$ | $PA_{10}$ | $MA_2$ |
| $VA_{11}$ | $PA_{11}$ | $MA_3$ |
| $VA_{12}$ | $PA_{12}$ | $MA_4$ |

At Step 404, CPU 112 operates as per its intended program and generates a virtual address (VA). At step 406 CPU 112 then checks TLB 113 for a corresponding translation. If none exists, CPU 112 per its typical operation will access the page table in the local memory 124 at step S408 to obtain the translation for the corresponding physical address (PA), and then log the translation in the TLB 113. The compute node 110 outputs the physical address out of I/O interface 122 at step 410 and awaits return of appropriate data responsive to its request. For a typical common processor 112, the physical address would correspond to the address of the data. However, in the preferred embodiment the physical address corresponds to a location in memory portal 300.

In response to the request, at step 412 memory portal processor 300 receives the physical addresses and identifies the corresponding address buffer 206, preferably by controller 336 providing its own translation of the requested physical address to the corresponding buffer; in addition and/or the alternative, some or all of the physical addresses can represent the physical address of the individual buffers 206.

At step 414 the selected buffer 206 determines whether it has any resident data in its data field. If data are present, the selected buffer is considered VALID; the data in the data field of the selected address buffer 206 is returned to the compute node 110 at step 424. This step should rarely occur in operation, typically only when the data from a previous request was lost and is re-requested.

As discussed above, each address buffer 206 in buffer bank 332 has a corresponding FIFO register 208 in register bank 334. If at step 414 data are not present in the data field of the specific address register 206, then at step 418 memory portal processor 300 obtains a physical address from the corresponding FIFO register 208; the physical address represents the actual physical address of the desired data request issued by compute node 110.

At step 420, memory portal 300 uses the physical address obtained from selected FIFO register 208 to obtain the corresponding data from whatever memory that it is stored in. The data are stored in the data field of the corresponding address buffer 206 at step 422, and sent to the originating compute node 110 at step 424.

At step 426, memory portal processor 300 clears its $+k^{th}$ buffer. That is, whatever the number (z) of the last buffer accessed, memory portal processor 300 identifies buffer (z+k, accounting for rollover if z+k is greater than 2k) and clears that buffer. For example with k=4, then an access of the first buffer (buffer MPB1) for the noted data clears out the fifth buffer (buffer MPB5); an access of the sixth buffer (buffer MPB6) clears the second buffer (buffer MPB2). As discussed below, this routine clearance process allows the same buffers in buffer bank 332 to be used over and over again to obtain physical addresses.

At step 428, compute node 110 receives the requested data. Pursuant to its typical operation, compute node 110 enters at least a portion of the physical address and received data into the level 1 cache, overwriting the cache (all levels) where necessary. The data retrieval process has been entirely transparent to processor 110—it outputted an address and received responsive data. Processor 110 has no idea that the physical address was directed to something other than the address of the data, or the memory portal processing described above.

The above process repeats for each virtual address that compute node 110 generates for the first 2k new requests. If there is an old request (e.g., compute node 110 did not receive the requested data such that it reissues the request, likely returning the data in the data field of buffer 206 at step 414/424), then the system does not advance to the next buffer 206 or FIFO register 208. For each sequential new request, the next buffer 206 in buffer bank 332 is used to get a physical address out of the next FIFO register 208 in register bank 334. The responsive data are written into the level 1 cache 114. For ease of discussion, the following description is based on new requests only, understanding that the system would not advance to the next buffer/register for an old request.

After the $2k^{th}$ request, each buffer in buffer bank 332 has been accessed once, and the physical address has been read out of the first field of each FIFO register 208 in register bank 334. Memory portal processor 300 will return to the first buffer in the stack of buffer bank 332. Even though this buffer previously held data responsive to a prior request, the contents of this buffer were cleared at the appropriate cycle during step 426 above. Thus the specific buffer is clear and ready to receive data from a new request. The next request (2k+1) would thus be sent by controller 336 to the first buffer in buffer bank 332, which in turn would consult its corresponding FIFO register of register bank 334. Since the first entry in the FIFO was accessed previously, the second entry would now be accessed at the appropriate step and returned to compute node 110.

Also, because the physical address from sets of k map to the same location in the level 1 cache 114, the response to the 2k+1 request maps to the same location as the first request and the k+1 request. This forces the level 1 cache 114 to expunge the k+1 entry, which is then written into the level 2 cache 116. This in turn forces the level 2 cache 116 to permanently expunge the first entry.

The above process repeats for each virtual address that compute node 110 generates for the each k new requests, up to the limit of the number of cache levels plus 1 (c+1). Thus, if the cache is 2 levels deep (c=2), then there will be 3k requests at this point, and the level 1 cache 114 and level 2 cache 116 will be holding the last 2k worth of response data. Also, the number of virtual addresses (total k(c+1)) would be at an end. Up until this point, the system should not have found any translation in the TLB, as each of the 1–k(c+1) requests called for a new translation.

For the next request (k(c+1)+1), the program will return to the first virtual address and its corresponding translation for a physical address (see, e.g., Table 1 above). However, by this point the entire PGE table, and all of its k(c+1) entries, are loaded into the TLB 113. For any subsequent translation needs, compute node will be able to find the translation in the TLB 113 without having to access the PGE in local memory 124. This effectively eliminates TLB thrashing, because there cannot be a "miss" due to the fictitious PGE table. All of these subsequent requests will also not find any duplicative entries in the cache, such prior entries having been permanently expunged from the cache before the page table was recycled.

The above can be illustrated by an example in which there are 4 address buffers 206 in buffer bank 332 and 2 levels of cache in the compute node 110. Thus k=2 and c=2. Assume that the program includes ten (10) data read requests.

At the initialization, the program of compute node populates the PGE of local memory with the fictitious translations. Six (6) are needed for k=2 and c=2 (k(c+1)), as follows:

| Virtual Address | Physical Address | Map Location in Cache |
|---|---|---|
| $VA_1$ | $PA_1$ | $MA_1$ |
| $VA_2$ | $PA_2$ | $MA_2$ |
| $VA_3$ | $PA_3$ | $MA_1$ |
| $VA_4$ | $PA_4$ | $MA_2$ |
| $VA_5$ | $PA_5$ | $MA_1$ |
| $VA_6$ | $PA_6$ | $MA_2$ |

Also, the four FIFO registers in register bank 334 need to be populated with the addresses of the ten (10) responsive data requests, as follows:

| FIFO register #1 | FIFO register #2 | FIFO register #3 | FIFO register #4 |
|---|---|---|---|
| Address #1 | Address #2 | Address #3 | Address #4 |
| Address #5 | Address #6 | Address #7 | Address #8 |
| Address #9 | Address #10 | | |

Since there are only 10 ten (data) requests for the program, the last two slots of the FIFOs are unused.

For the first data request, virtual address #1 is generated. No translation exists in the TLB 113, so the translation is obtained from the PGE in local memory 124 and stored in TLB 113. The physical address #1 sends the request to memory portal 300, which accesses the buffer #1 in buffer bank 332, obtains the Address #1 from the corresponding first field of the FIFO register #1 of register bank 334, and then obtains the corresponding data # 1. The data are written into the level 1 cache 114. Buffer #3 is cleared.

| TLB contents | Buffer #1-4 Contents | FIFO accessed (#, field) | Level 1 cache | Level 2 cache |
|---|---|---|---|---|
| VA1, PA1 | Data#1<br>Empty<br>Empty (Cleared)<br>Empty | #1, first field | Data #1 | |

For the second data request, virtual address #2 is generated. No translation exists in the TLB 113, so the translation is obtained from the PGE in local memory 124 and stored in TLB 113. The resulting physical address #2 sends the request to memory portal 300, which accesses the buffer #2 in buffer bank 332, obtains the Address #2 from the corresponding first field of the FIFO register #2 of register bank 334, and then obtains the corresponding data # 2. The data are written into the level 1 cache 114. Buffer #4 is cleared.

| TLB contents | Buffer #1-4 Contents | FIFO accessed (#, field) | Level 1 cache | Level 2 cache |
|---|---|---|---|---|
| VA1, PA1<br>VA2, PA2 | Data#1<br>Data #2<br>Empty<br>Empty (Cleared) | #2, first field | Data #1<br>Data #2 | |

For the third data request, virtual address #3 is generated. No translation exists in the TLB 113, so the translation is obtained from the PGE in local memory 124 and stored in TLB 113. The resulting physical address #3 sends the request to memory portal 300, which accesses the buffer #3 in buffer bank 332, obtains the Address #3 from the corresponding first field of the FIFO register #3 of register bank 334, and then obtains the corresponding data # 3. The data are written into the level 1 cache 114, which expels data #1 into the level 2 cache 116. Buffer #1 is cleared.

| TLB contents | Buffer #1-4 Contents | FIFO accessed (#, field) | Level 1 cache | Level 2 cache |
|---|---|---|---|---|
| VA1, PA1<br>VA2, PA2<br>VA3, PA3 | Empty (Cleared)<br>Data #2<br>Data #3<br>Empty | #3, first field | Data #3<br>Data #2 | Data #1 |

For the fourth data request, virtual address #4 is generated. No translation exists in the TLB 113, so the translation is obtained from the PGE in local memory 124 and stored in TLB 113. The resulting physical address #4 sends the request to memory portal 300, which accesses the buffer #4 in buffer bank 332, obtains the Address #4 from the corresponding first field of the FIFO register #4 of register bank 334, and then obtains the corresponding data # 4. The data are written into the level 1 cache 114, which expels data #2 into the level 2 cache 116. Buffer #2 is cleared.

| TLB contents | Buffer #1-4 Contents | FIFO accessed (#, field) | Level 1 cache | Level 2 cache |
|---|---|---|---|---|
| VA1, PA1<br>VA2, PA2<br>VA3, PA3<br>VA4, PA4 | Empty<br>Empty (Cleared)<br>Data #3<br>Data #4 | #4, first field | Data #3<br>Data #4 | Data #1<br>Data #2 |

For the fifth data request, virtual address #5 is generated. No translation exists in the TLB 113, so the translation is obtained from the PGE in local memory 124 and stored in TLB 113. The resulting physical address #5 sends the request to memory portal 300, which accesses the buffer #1 in buffer bank 332, obtains the Address #5 from the corresponding second field of the FIFO register #1 of register bank 334, and then obtains the corresponding data # 5. The data are written into the level 1 cache 114, forcing the expulsion of Data #3 into level 2 cache 116 and the permanent expulsion of data #1. Buffer #3 is cleared.

| TLB contents | Buffer #1-4 Contents | FIFO accessed (#, field) | Level 1 cache | Level 2 cache |
|---|---|---|---|---|
| VA1, PA1<br>VA2, PA2<br>VA3, PA3<br>VA4, PA4<br>VA5, PA5 | Data #5<br>Empty<br>Empty (Cleared)<br>Data #4 | #1, second field | Data #5<br>Data #4 | Data #3<br>Data #2 |

For the sixth data request, virtual address #6 is generated. No translation exists in the TLB 113, so the translation is obtained from the PGE in local memory 124 and stored in TLB 113. The resulting physical address #6 sends the request to memory portal 300, which accesses the buffer #2 in buffer bank 332, obtains the Address #6 from the corresponding second field of the FIFO register #2 of register bank 334, and then obtains the corresponding data #6. The data are written into the level 1 cache 114, forcing the expulsion of Data #4 into the level 2 cache and the permanent expulsion of data #2. Buffer #4 is cleared.

| TLB contents | Buffer #1-4 Contents | FIFO accessed (#, field) | Level 1 cache | Level 2 cache |
|---|---|---|---|---|
| VA1, PA1<br>VA2, PA2<br>VA3, PA3<br>VA4, PA4<br>VA5, PA5<br>VA6, PA6 | Data #5<br>Data #6<br>Empty<br>Empty (Cleared) | #2, second field | Data #5<br>Data #6 | Data #3<br>Data #4 |

For the seventh data request, the number of available virtual addresses is at an end, so the program begins again with virtual address #1. Since a translation exists in the TLB 113, it is obtained directly from TLB 113 without accessing the PGE in local memory 124. The resulting physical address #1 sends the request to memory portal 300, which accesses the buffer #3 in buffer bank 332, obtains the Address #7 from the corresponding second field of the FIFO register #3 of register bank 334, and the obtains the corresponding data #7. The data are written into the level 1 cache 114, forcing the expulsion of Data #5 into the level 2 cache and the permanent expulsion of data #3. Buffer #1 is cleared.

| TLB contents | Buffer #1-4 Contents | FIFO accessed (#, field) | Level 1 cache | Level 2 cache |
|---|---|---|---|---|
| VA1, PA1 | Empty (cleared) | #3, second field | Data #7 | Data #5 |
| VA2, PA2 | Data #6 | | Data #6 | Data #4 |
| VA3, PA3 | Data #7 | | | |
| VA4, PA4 | Empty | | | |
| VA5, PA5 | | | | |
| VA6, PA6 | | | | |

For the eighth data request, the program generates virtual address #2. Since a translation exists in the TLB 113, it is obtained directly from TLB 113 without accessing the PGE in local memory 124. The resulting physical address #2 sends the request to memory portal 300, which accesses the buffer #4 in buffer bank 332, obtains the Address #8 from the corresponding second field of the FIFO register #4 of register bank 334, and then obtains the corresponding data #8. The data are written into the level 1 cache 114, forcing the expulsion of Data #6 into the level 2 cache and the permanent expulsion of data #4. Buffer #2 is cleared.

| TLB contents | Buffer #1-4 Contents | FIFO accessed (#, field) | Level 1 cache | Level 2 cache |
|---|---|---|---|---|
| VA1, PA1 | Empty | #4, second field | Data #7 | Data #5 |
| VA2, PA2 | Empty (cleared) | | Data #8 | Data #6 |
| VA3, PA3 | Data #7 | | | |
| VA4, PA4 | Data #8 | | | |
| VA5, PA5 | | | | |
| VA6, PA6 | | | | |

For the ninth data request, the program generates virtual address #3. Since a translation exists in the TLB 113, it is obtained directly from TLB 113 without accessing the PGE in local memory 124. The resulting physical address #3 sends the request to memory portal 300, which accesses the buffer #1 in buffer bank 332, obtains the Address #9 from the corresponding third field of the FIFO register #1 of register bank 334, and the obtains then corresponding data #9. The data are written into the level 1 cache 114, forcing the expulsion of Data #7 into the level 2 cache and the permanent expulsion of data #5. Buffer #3 is cleared.

| TLB contents | Buffer #1-4 Contents | FIFO accessed (#, field) | Level 1 cache | Level 2 cache |
|---|---|---|---|---|
| VA1, PA1 | Data #9 | #1, third field | Data #9 | Data #7 |
| VA2, PA2 | Empty | | Data #8 | Data #6 |
| VA3, PA3 | Empty (cleared) | | | |
| VA4, PA4 | Data #8 | | | |
| VA5, PA5 | | | | |
| VA6, PA6 | | | | |

For the tenth data request, the program generates virtual address #4. Since a translation exists in the TLB 113, it is obtained directly from TLB 113 without accessing the PGE in local memory 124. The resulting physical address #4 sends the request to memory portal 300, which accesses the buffer #2 in buffer bank 332, obtains the Address #10 from the corresponding third field of the FIFO register #2 of register bank 334, and then obtains the corresponding data #10. The data are written into the level 1 cache 114, forcing the expulsion of Data #8 into the level 2 cache and the permanent expulsion of data #6. Buffer #4 is cleared.

| TLB contents | Buffer #1-4 Contents | FIFO accessed (#, field) | Level 1 cache | Level 2 cache |
|---|---|---|---|---|
| VA1, PA1 | Data #9 | #2, third field | Data #9 | Data #7 |
| VA2, PA2 | Data #10 | | Data #10 | Data #8 |
| VA3, PA3 | Empty | | | |
| VA4, PA4 | Empty (cleared) | | | |
| VA5, PA5 | | | | |
| VA6, PA6 | | | | |
| VA7, PA7 | | | | |
| VA8, PA8 | | | | |

The program is now complete, having performed the programmed ten steps. Note that the last two entries in register bank 334 were not required for this program, and thus were not used. However, they could have been allocated had the number of program steps been longer. In some cases the number of steps in the program will exceed the allotted address slots in FIFO bank 334. The program will need to keep adding the new data to register bank 334, either on the fly or at intervals during processing.

The above examples demonstrate why k and c are preferably control elements on the numbers of buffers and addresses. By using an even number (2k) of registers, when a current register is in use, the subsequent kth one in sequence is cleared. This allows for the buffer contents to be continually reused without conflict with subsequent data requests. It also allows the buffers to hold the data at least temporarily in case it is needed before the buffer later clears.

The use of k(c+1) addresses ensures that all of the entries of the PGE table will be stored in the TLB 313. Any subsequently generated virtual address will be found in the TLB, such that there will be no "misses" and no need to further access the PGE within local memory 313. This effectively eliminates TLB thrashing and the associated latency. The k(c+1) addresses also ensure that any prior data returned for a previously used physical address will have been previously expunged by the cache, thus avoiding conflicting data recalls.

While the above discussion has focused on read requests, the same principles apply to write requests. The difference is that no response data are returned to buffer bank 332 or to the compute node 110. The associated individual buffers 206 are invalidated automatically (as if data was actually present).

The address space of the system may be larger than the native address space of a single processor. This is because the address source for memory portal 300 may generate larger addresses as data in the processor. Memory Portal processor 300 uses these larger addresses, passing them to network 126. These larger addresses may be used by network 126 to route the requests to the appropriate point in the system, and then use a subset of the address to access the data at the remote processor.

Memory portal processor 300 preferably has a larger prefetch capability than compute node 110, preferably at a size k. A non-limiting example of k would be 64, which is much larger than the 8-16 of the typical compute node 110.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

For example, 2k is preferably used as a control number for the number of buffers, but an odd number can also be used. The system may clear different buffers other than the +k$^{th}$ as desired so long as the buffer of interest is cleared before its reuse.

Although FIFO registers are preferred for register bank 334, the invention is not so limited, and other registers may be used. Nor need the buffers and registers share a one-to-one correspondence.

The number of addresses in the PGE table is preferably minimized to provide one address for every buffer for each level of the cache. However, larger PGE tables could be used, although the number of addresses preferably does not exceed what the TLB 113 can store.

Memory portal processor 300 is preferably a stand alone IC which cooperates with a predetermined number of separate compute nodes. However, the invention is not so limited, as the methodology could be bundled with one or more compute nodes 110, or implemented as software controlling other structures in the computer network.

In the above embodiments, the request induces the buffers to obtain individual addresses and corresponding data. However, the invention is not so limited. In anticipation of future requests, the system could be configured to obtain future addresses and/or responsive data and store them in the buffers for future requests. In theory, thus could be done up to the limit of what is expected to be cleared at step 426. Thus in the above example of k=2, the first two buffers could be loaded with data anticipating the first two requests; but the third would not because it would be cleared in response to the first request.

Also in the above embodiments, the address register bank 334 of FIFO registers 208 is preloaded with addresses. However, the invention is not so limited, and other address generation and loading methods may be used. By way of non-limiting example, compute node 110 may generate a complete list of M physical addresses, with M>2kN (N is the depth of each FIFO register 208) and store them in its local memory 124. The FIFO registers 208 may be initialized with control information to proactively fetch the next incremental lists of physical addresses from the local memory 124 of the corresponding compute node 110. As the FIFOs begin to empty, they will generate read requests to the compute nodes local memory for the next set of n<=N addresses to refill their FIFOs.

In the alternative, the address register bank 334 could be replaced with address generation logic. An address generator, G(B,L,I) can typically be programmed with a base address B, a limit address L, and an increment I. The first address generated is the base address B, the next is the B+I, followed by B+2I, etc., until the limit address L is reached. The whole register bank 334 could be replaced with a single address generator G(B,L,I) or each register FIFO MPAi,x could be replaced with it's own address generator Gi(Bi,Li,Ii).

We claim:

1. A method for retrieving and managing addresses of data amongst a bank of m buffers and a corresponding bank of m registers, wherein m is a positive integer, the method comprising:
   receiving, at a first buffer of the m buffers, a request for an address;
   obtaining the address from a corresponding first register of the m registers;
   sending the address, received by said obtaining, to a destination;
   storing the address, received by the obtaining, in the first buffer; and
   clearing the contents of a second buffer of the m buffers, in response to any of said receiving, obtaining or storing, without clearing the contents of said first buffer.

2. The method of claim 1, wherein said clearing comprises clearing the contents of the second buffer of the m buffers, in response to any of said receiving, obtaining or storing, without clearing the contents of any remaining buffers of the m buffers.

3. The method of claim 1, wherein said second buffer is k buffers downstream from said first buffer, and k is a positive integer.

4. The method of claim 3, wherein k<m.

5. The method of claim 3, wherein m is an even number, and m=2k.

6. The method of claim 1, wherein the registers are FIFO registers.

7. The method of claim 1, further comprising, before said receiving, populating said registers with physical addresses.

8. A method for retrieving and managing physical addresses amongst a local node, a local memory, and a memory manager, the method comprising:
   an initialization phase, comprising:
      defining a program to be executed; and
      establishing, in the local memory, a table of virtual addresses and corresponding fictitious physical addresses, the fictitious physical addresses corresponding to locations within the memory manager, each virtual address and corresponding fictitious physical address having a corresponding actual physical address of responsive data for execution of the program;
   a first retrieval phase, comprising:
      generating a virtual address at the local node;
      retrieving, from the table, a fictitious physical address that corresponds to the generated virtual address;
      entering the fictitious physical address and the corresponding virtual address into a buffer in the local node; and
      utilizing, in conjunction with the memory manager, the retrieved fictitious address to obtain the actual physical address that corresponds to the virtual address;
   a second retrieval phase, following the first retrieval phase, comprising:
      generating, at the local node, a virtual address;
      obtaining, from the buffer in the local node, a fictitious physical address corresponding to the virtual address; and
      utilizing the retrieved fictitious address to obtain the actual physical address that corresponds to the virtual address;
   wherein the first retrieval phase completes when the table is entered into the buffer in the local node; and wherein, during the second retrieval phase, the local node will no longer need to access the table to complete the program regardless of the number of remaining instructions in the program.

9. The method of claim 8, wherein the memory manager includes m buffers and m corresponding registers, wherein the local node has a c-level cache, where c is a positive integer greater than or equal to two, and the table includes (c+1)(m/2) virtual addresses and corresponding fictitious physical addresses.

10. The method of claim 8, wherein said utilizing in the first and second retrieval phases comprises:
   receiving, at the memory manager, the fictitious physical address;
   identifying a first buffer of the m buffers that corresponds to the received fictitious physical address;
   obtaining, using a corresponding first register of the m registers, the corresponding actual physical address;
   sending the actual physical address, received by said obtaining, to the local node;
   storing the actual physical address, received by the obtaining, in the first buffer; and
   clearing the contents of a second buffer of the m buffers without clearing the contents of said first buffer.

11. The method of claim 10, wherein said clearing comprises clearing the contents of the second buffer of the m buffers without clearing the contents of any remaining buffers of the m buffers.

12. The method of claim 10, wherein the registers are FIFO registers.

13. The method of claim 10, further comprising, during the initialization phase, populating said registers with the actual physical addresses.

14. The method of claim 8, wherein said second buffer is k buffers downstream from said first buffer, and k is a positive integer.

15. The method of claim 14, wherein k<m.

16. The method of claim 14, wherein m is an even number, and m=2k.

17. A system for retrieving and managing addresses, comprising:
   a memory portal processor comprising a bank of m buffers and a corresponding bank of m registers, where m is a positive integer, the memory portal processor configured to:
      receive, at a first buffer of the m buffers, a request for an address, where m is a positive integer;
      obtain the address from a corresponding first register of the m registers;
      send the address, received by said obtaining, to a destination;
      store the address, received by the obtaining, in the first buffer; and
      clear the contents of a second buffer of the m buffers without clearing the contents of said first buffer.

18. The system of claim 17, wherein said system is configured to clear the contents of the second buffer of the m buffers, in response to any of said receiving, obtaining or storing, without clearing the contents of any remaining buffers of the m buffers.

19. The system of claim 17, wherein said second buffer is k buffers downstream from said first buffer, and k is a positive integer.

20. The system of claim 17, wherein k<m.

21. The system of claim 17, wherein m is an even number, and m=2k.

22. The system of claim 17, wherein the registers are FIFO registers.

23. The system of claim 17, wherein said system is configured to an initial step of populating said registers with physical addresses.

24. A system for retrieving and managing physical addresses, comprising:
   a local node, a local memory, and a memory manager, configured to:
   in an initialization phase:
      define a program to be executed; and
      establish, in the local memory, a table of virtual addresses and corresponding fictitious physical addresses, the fictitious physical addresses corresponding to locations within the memory manager, each virtual address and corresponding fictitious physical address having a corresponding actual physical address of responsive data for execution of the program;
   in a first retrieval phase:
      generate a virtual address at the local node;
      retrieve, from the table, a fictitious physical address that corresponds to the generated virtual address;
      enter the fictitious physical address and the corresponding virtual address into a buffer in the local node; and
      utilize, in conjunction with the memory manager, the retrieved fictitious address to obtain the actual physical address that corresponds to the virtual address;
   in a second retrieval phase, following the first retrieval phase:
      generate, at the local node, a virtual address;
      obtain, from the buffer in the local node, a fictitious physical address corresponding to the virtual address; and
      utilize the retrieved fictitious address to obtain the actual physical address that corresponds to the virtual address;
   wherein the first retrieval phase completes when the table is entered into the buffer in the local node; and
   wherein, during the second retrieval phase, the local node will no longer need to access the table to complete the program regardless of the number of remaining instructions in the program.

25. The system of claim 24, wherein the memory manager includes m buffers and m corresponding registers, wherein the local node has a c-level cache, where c is a positive integer greater than or equal to two, and wherein the table includes (c+1)(n/2) virtual addresses and corresponding fictitious physical addresses.

26. The system of claim 24, wherein said utilization in the first and second retrieval phases comprises:
   receiving, at the memory manager, the fictitious physical address;
   identifying a first buffer of the m buffers that corresponds to the received fictitious physical address;
   obtaining, using a corresponding first register of the m registers, the corresponding actual physical address;
   sending the actual physical address, received by said obtaining, to the local node;
   storing the actual physical address, received by the obtaining, in the first buffer; and
   clearing the contents of a second buffer of the m buffers without clearing the contents of said first buffer.

27. The system of claim 26, wherein said clearing comprises clearing the contents of the second buffer of the m buffers without clearing the contents of any remaining buffers of the m buffers.

28. The system of 26, wherein said second buffer is k buffers downstream from said first buffer, and k is a positive integer.

29. The system of claim 28, wherein k<m.

30. The system of claim 28, wherein m is an even number, and m=2k.

31. The system of claim 26, wherein the registers are FIFO registers.

32. The system of claim 26, further comprising, during the initialization phase, populating said registers with the actual physical addresses.

* * * * *